(12) United States Patent
Jong et al.

(10) Patent No.: US 8,098,346 B2
(45) Date of Patent: Jan. 17, 2012

(54) MOLD FRAME AND BEZEL AND LIQUID CRYSTAL DISPLAY CONTAINING THE SAME

(75) Inventors: Lid-Joon Jong, Hsin-Chu (TW); Ren-Mei Tseng, Hsin-Chu (TW); Chih-Liang Pan, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 289 days.

(21) Appl. No.: 12/026,663

(22) Filed: Feb. 6, 2008

(65) Prior Publication Data

US 2009/0079893 A1 Mar. 26, 2009

(30) Foreign Application Priority Data

Sep. 21, 2007 (TW) .................................. 96135480

(51) Int. Cl.
*G02F 1/1333* (2006.01)
(52) U.S. Cl. ........................................................ 349/58
(58) Field of Classification Search ...................... 349/58
See application file for complete search history.

(56) References Cited

U.S. PATENT DOCUMENTS

| | | | |
|---|---|---|---|
| 6,201,586 B1 | 3/2001 | Nakayama | |
| 6,583,843 B2 | 6/2003 | Ishino | |
| 6,587,166 B1 | 7/2003 | Lee et al. | |
| 6,847,416 B2 | 1/2005 | Lee et al. | |
| 7,292,290 B2 * | 11/2007 | Miyagawa et al. | 349/58 |
| 7,301,588 B2 * | 11/2007 | Ogawa | 349/58 |
| 7,864,260 B2 * | 1/2011 | Lee et al. | 349/58 |
| 2002/0051102 A1 * | 5/2002 | Kuroki et al. | 349/58 |
| 2004/0090567 A1 * | 5/2004 | Lee et al. | 349/58 |
| 2005/0116913 A1 * | 6/2005 | Ha et al. | 345/89 |
| 2007/0046855 A1 * | 3/2007 | Choi et al. | 349/58 |
| 2007/0279547 A1 * | 12/2007 | Tanaka | 349/58 |
| 2009/0237586 A1 * | 9/2009 | Han et al. | 349/58 |

FOREIGN PATENT DOCUMENTS

| | | |
|---|---|---|
| CN | 1461965 | 12/2003 |
| CN | 1580888 | 2/2005 |
| TW | 188419 | 8/1992 |

(Continued)

OTHER PUBLICATIONS

English translation of abstract and pertinent parts of TW 200535756 A, Nov. 1, 2005.

(Continued)

*Primary Examiner* — Eric Wong
(74) *Attorney, Agent, or Firm* — Thomas, Kayden, Horstemeyer & Risley, LLP

(57) ABSTRACT

A mold frame and a bezel are disclosed. The mold frame includes a bottom portion having a first side, wherein the first side has a first end and a second end opposite to the first end, and there is only one stopper set disposed on the first side. The stopper set is composed of a plurality of stoppers sequentially arranged from the first end to the second end, wherein the first stopper of the stopper set is spaced a first distance apart from the first end; and/or the last stopper of the stopper set is spaced a second distance apart from the second end. The bezel is used for accommodating the aforementioned mold frame, and includes a first side structure having a first opening; and/or a second side structure having a second opening. A liquid crystal display is also disclosed, and includes the mold frame and bezel.

17 Claims, 7 Drawing Sheets

FOREIGN PATENT DOCUMENTS

| | | |
|---|---|---|
| TW | 420319 | 1/2001 |
| TW | 522353 | 3/2003 |
| TW | 200535756 A | 11/2005 |

OTHER PUBLICATIONS

English translation of abstract and pertinent parts of TW 522353, Mar. 1, 2003.

English language translation of abstract of CN 1461965, Dec. 17, 2003.

English language translation of abstract of TW 420319, Jan. 21, 2001.

English language translation of abstract of TW 188419, Aug. 1, 1992.

English language translation of abstract of CN 1580888, Feb. 16, 2005.

* cited by examiner

US 8,098,346 B2

MOLD FRAME AND BEZEL AND LIQUID CRYSTAL DISPLAY CONTAINING THE SAME

RELATED APPLICATIONS

This application claims priority to Taiwan Application Serial Number 96135480, filed Sep. 21, 2007, which is herein incorporated by reference.

BACKGROUND

1. Field of Invention

The present invention relates to a mold frame, a bezel and a liquid crystal display (LCD) containing the mold frame and the bezel, and more particularly, to a mold frame, a bezel and a LCD containing the mold frame and the bezel for improving the problem that a glass substrate is susceptible to being broken.

2. Description of Related Art

In the structure of a conventional notebook computer, a plurality of stoppers are disposed on a side of a mold frame adjacent to a flexible print circuit board (FPC) of a glass substrate (panel), and are used for controlling the position of the glass substrate in the direction vertical to the FPC. When a shock test is performed, these stoppers can sustain the impact of the glass substrate moving in the direction, vertical to the FPC. However, with the increase of the number of integrated circuits (IC) due to higher panel resolution, the width of the FPC is also increased, and thus the widths of the stoppers have to be reduced so as to match the increased width of the FPC. Accordingly, the contact area between the glass substrate and the stoppers is reduced, thus forming stress concentration. When a high impact test is performed, such as 220G-260G, the glass substrate is very likely to suffer the problem of broken panel after hitting the stoppers, thus causing abnormal panel display. Since stoppers located at both ends of the mold frame generally receive the biggest impact, the problem of broken panel often occurs at two corners of the glass substrate corresponding to those two stoppers.

Further, as a glass substrate becomes increasingly thinner, the strength of the glass substrate is lower, and thus the problem of glass substrate which is susceptible to being broken is more likely to occur. A conventional skill uses anti-slip tape to improve this problem, but the effect thereby is limited with increasing assembly difficulty and fabrication cost.

SUMMARY

Hence, an aspect of the present invention is directed to a mold frame, a bezel and a LCD containing the mold frame and the bezel for using the improved design of the mold frame and the bezel to improve the problem of the glass substrate of which the corners are susceptible to being broken under the trends of the increasing FPC width (i.e. greater resolution) and the increasingly thinned glass substrate.

An embodiment of a mold frame comprises a bottom portion having a first side, wherein the first side has a first end and a second end opposite to the first end. There is a stopper set disposed on the first side, and the stopper set is composed of a plurality of stoppers sequentially arranged from the first end to the second end, and the first stopper of the stopper set is spaced a first distance apart from the first end.

In another embodiment, the last stopper of the stopper set is disposed at the second end of the first side of the mold frame.

In another embodiment, the last stopper of the stopper set is spaced a second distance apart from the second end of the first side of the mold frame.

An embodiment of an assembly structure is provided for receiving a liquid crystal panel. The assembly structure comprises the aforementioned mold frame and a bezel, wherein the mold frame is accommodated in the bezel. The bezel has a first side structure, and the first side structure has a first opening and is corresponding to the first end of the mold frame.

In another embodiment, the bezel has a second side structure, and the second side structure has a second opening and is corresponding to the second end of the mold frame.

An embodiment of a LCD comprises the aforementioned mold frame, a FPC, the aforementioned bezel and a liquid crystal panel. The FPC is disposed in gaps among the stoppers, wherein the FPC has a first border adjacent to the first end of the mold frame. The first side structure is corresponding to the region between the first end of the mold frame and the first border of the FPC. The liquid crystal panel is disposed on the bottom portion of the mold frame.

In another embodiment, the shape of the aforementioned first side structure of the bezel is conformed to a first design area ratio, and the first design area ratio is a first projected overlap area divided by a first panel portion area, wherein the first projected overlap area is an area of the first side structure of the bezel projecting on a side of the liquid crystal panel, and the first panel portion area is an area of the side of the liquid crystal panel corresponding to the region between the first end of the mold frame and the first border of the FPC.

In another embodiment, the FPC has a second border adjacent to the second end of the mold frame, and the aforementioned second side structure is corresponding to the region between the second end of the mold frame and the second border of the FPC.

In another embodiment, the shape of the aforementioned second side structure is conformed to a second design area ratio, and the second design area ratio is a second projected overlap area divided by a second panel portion area, wherein the second projected overlap area is an area of the second side structure of the bezel projecting on a side of the liquid crystal panel, and the second panel portion area is an area of the side of the liquid crystal panel corresponding to the region between the second end of the mold frame and the second border of the FPC.

In another embodiment, the LCD further comprises a reflective sheet, a light guide plate adjoining to the reflective sheet, at least one optical film and the aforementioned liquid crystal panel. The reflective sheet is disposed in the inner surface of the bottom portion. The optical film is disposed on the light guide plate, and the liquid crystal panel is disposed on the optical film.

Hence, the application of the present invention can effectively improve the problem of the glass substrate that is susceptible to being broken under the trends of the increasing FPC width (i.e. greater resolution) and the increasingly thinned glass substrate.

It is to be understood that both the foregoing general description and the following detailed description are examples, and are intended to provide further explanation of the present invention as claimed.

BRIEF DESCRIPTION OF THE DRAWINGS

The present invention will become more fully understood from the detailed description given herein below and the accompanying drawings, given by way of illustration only and thus not intended to be limitative of the present invention, where.

DESCRIPTION OF THE PREFERRED EMBODIMENTS

Figure 1:
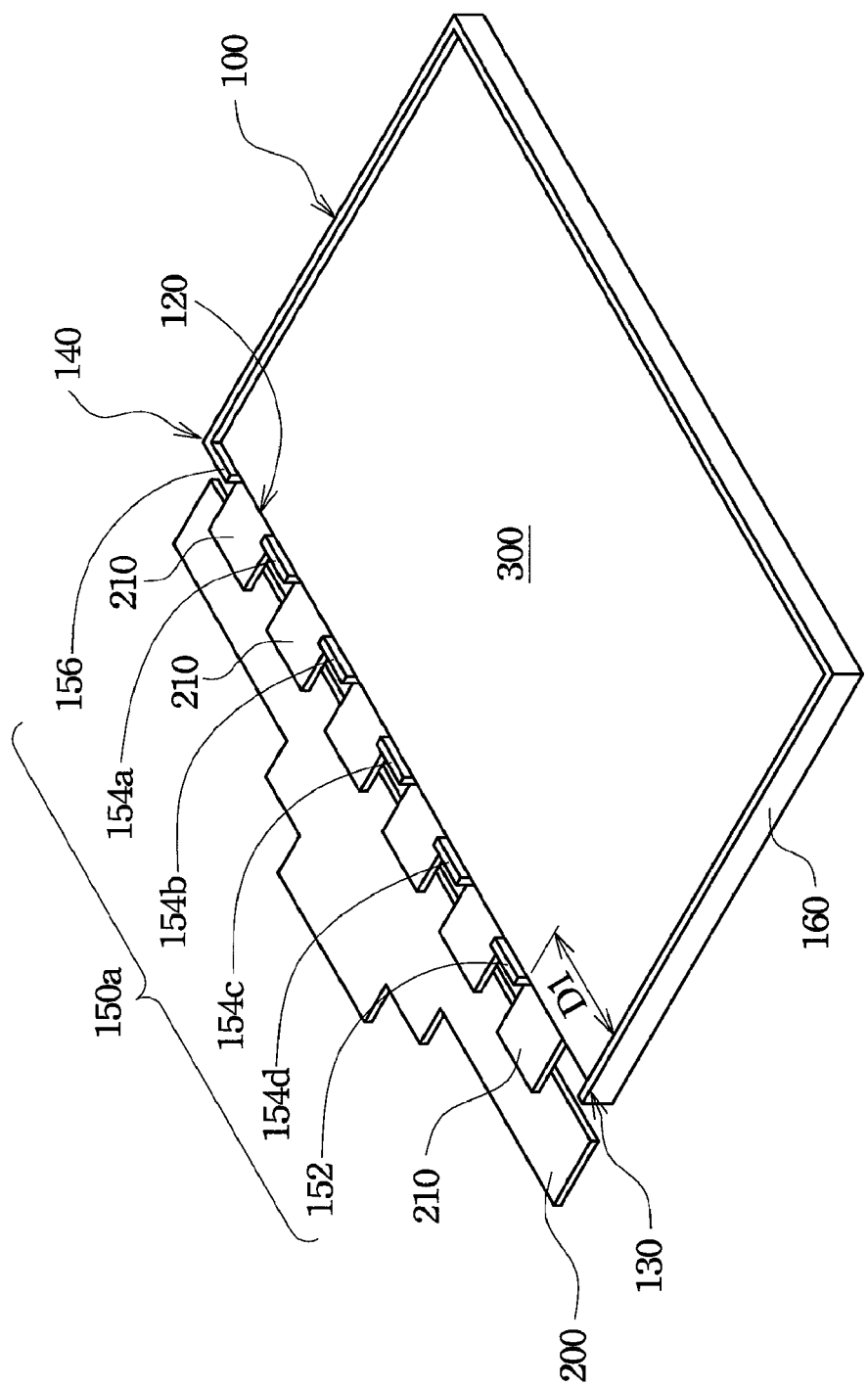
FIG. 1 is a schematic diagram illustrating the relevant structure of a mold frame according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention intends not to dispose a stopper on at least one of both ends of a mold frame, and to fabricate a side structure having an opening at an end of a bezel corresponding to the end of the mold frame at which no stopper is disposed, thereby preventing a liquid crystal panel from having the problem of broken panel due to hitting the stoppers and the bezel. The mold frame of the present invention can be such as a plastic frame, and the bezel of the present invention can be such as a metal frame, but the present invention is not limited thereto. Hereinafter, various embodiments of the present invention are described.

Embodiment 1

FIG. 1 is a schematic diagram illustrating the relevant structure of a mold frame according to a first embodiment of the present invention. In this embodiment, a mold frame 100 comprises a bottom portion (not labeled) for holding a liquid crystal panel 300, i.e. the bottom portion is located under the liquid crystal panel 300. A FPC 210 is connected to one side of the liquid crystal panel 300, and one side of the FPC 210 is connected to a printed circuit board 200.

The bottom portion of the mold frame 100 has a first side 120, wherein the first side 120 has a first end 130 and a second end 140 opposite to the first end 130. The first side 120 has a stopper set 150 disposed thereon. The stopper set 150a is composed of a plurality of stoppers 152, 154d, 154c, 154b, 154a and 156 sequentially arranged from the first end 130 to the second end 140. The first stopper 152 of the stopper set 150a is spaced a first distance D1 apart from the first end 130, and the stopper 156 is disposed at the second end 140, i.e. no stopper is disposed at the first end 130 of the mold frame 100.

Thus, when there is an impact exerted on the first side 120 of the mold frame 100, the corner of the liquid crystal panel 300 corresponding to the first end 130 is not broken since it does not hit the stopper, and the other corner of the liquid crystal panel 300 corresponding to the second end 140 has less impact on the stopper 156 since the entire panel moves a little bit outward from the first end 130, thereby lowering the probability of broken panel. Further, the mold frame 100 comprises a sidewall 160 disposed at one of the other sides of the bottom portion besides the first side 120, and the sidewall 160 is used for securing the liquid crystal panel 300. The liquid crystal panel 300 can be higher or lower than the sidewall 160 and the stoppers 152, 154d, 154c, 154b, 154a and 156, as long as the liquid crystal panel 300 can be restrained by the sidewall 160 and the stoppers 152, 154d, 154c, 154b, 154a and 156.

Figure 2:
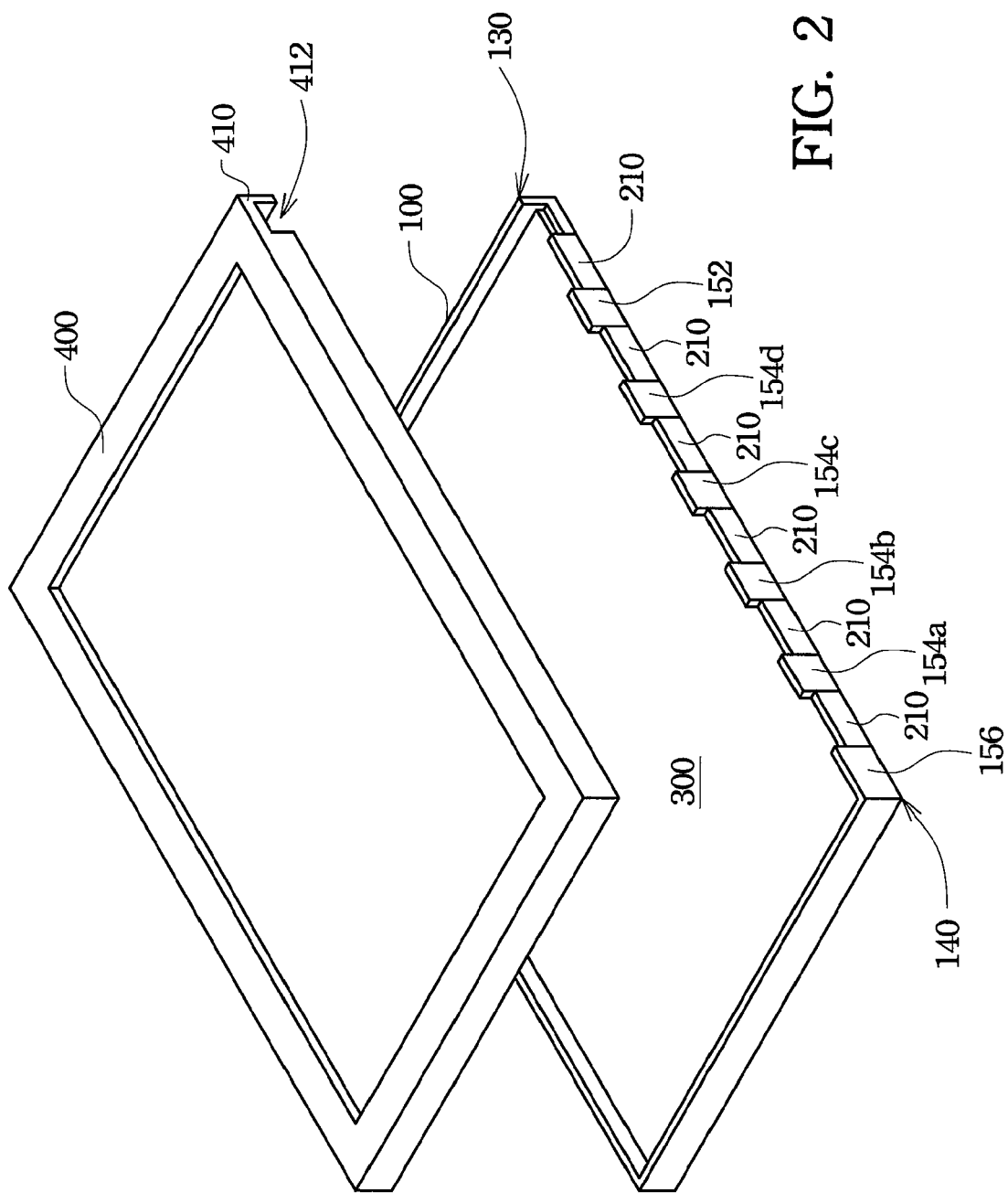
FIG. 2 is a schematic diagram illustrating an assembly structure of the mold frame and a bezel according to the first embodiment of the present invention.

FIG. 2 is a schematic diagram illustrating an assembly structure of the mold frame and a bezel according to the first embodiment of the present invention, wherein the printed circuit board (not shown) is folded to be under the mold frame 300, and the FPC 210 is folded into the gaps among the stoppers and the area between the stopper 152 and the first end 130. For matching the design of the mold frame 100, a bezel 400 has a first side structure 410 built thereon. The first side structure 410 has a first opening 412 and is corresponding to the first end 130 of the mold frame 100. With the setup of the first opening 412, when the first side 120 of the mold frame 100 is hit, the corner of the liquid crystal panel 300 corresponding to the first end 130 will not be broken due to hitting the bezel 400.

Hence, the assembly structure of the mold frame 100 and the bezel 400 according to this embodiment can prevent the problem of the liquid crystal panel 300 of which the corners are susceptible to being broken.

Embodiment 2

Figure 3:
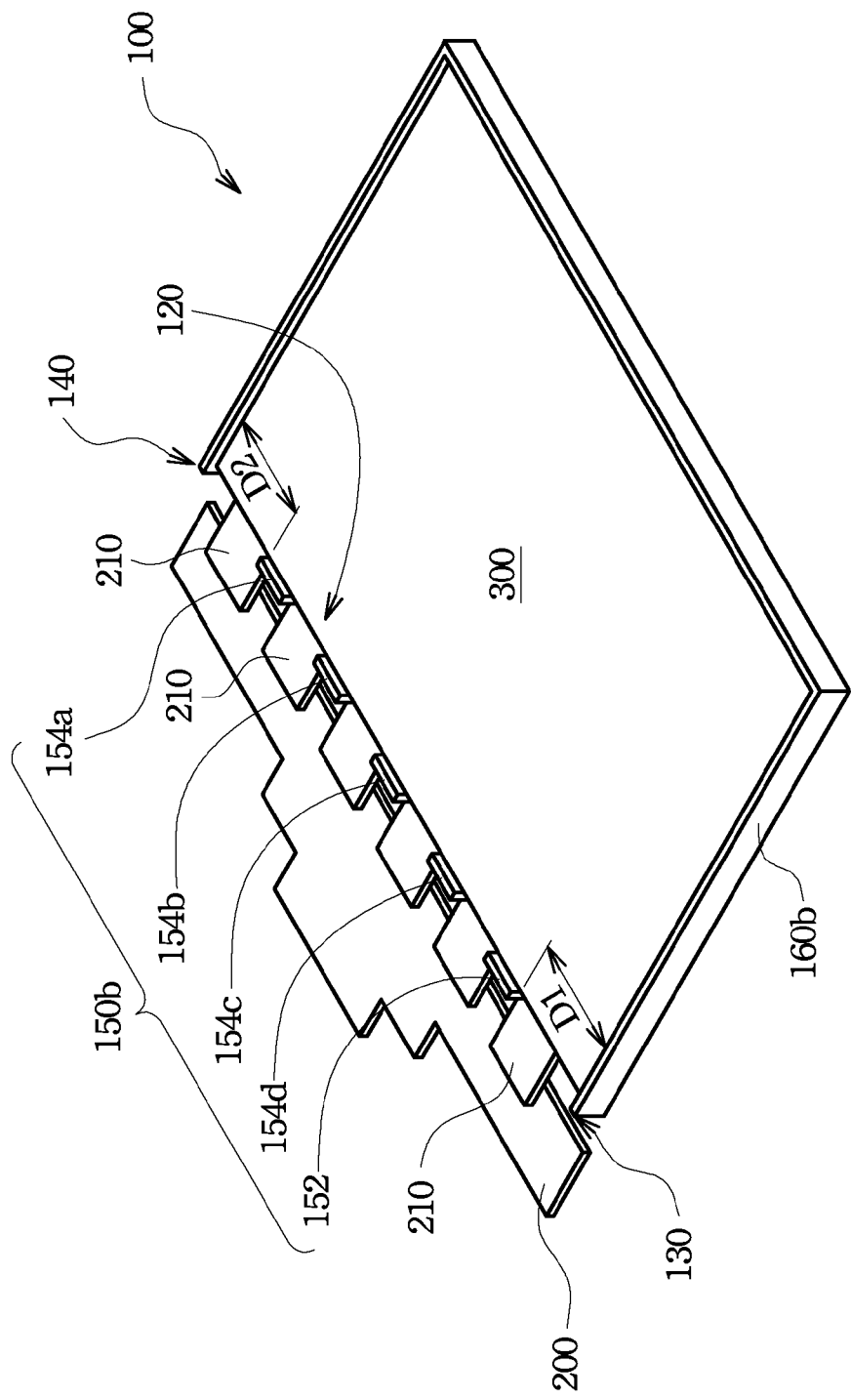
FIG. 3 is a schematic diagram illustrating the relevant structure of a mold frame according to a second embodiment of the present invention.

FIG. 3 is a schematic diagram illustrating the relevant structure of a mold frame according to a second embodiment of the present invention. The difference between the first embodiment and this embodiment is that a stopper set 150b is composed of a plurality of stoppers 152, 154d, 154c, 154b and 154a sequentially arranged from the first end 130 to the second end 140. The first stopper 152 of the stopper set 150b is spaced a first distance D1 apart from the first end 130, and the last stopper 154a of the stopper set 150b is spaced a second distance D2 apart from the second end 140, i.e. no stoppers are disposed at the first end 130 and the second end 140 of the mold frame 100. Thus, when there is an impact exerted on the first side 120 of the mold frame 100, both corners of the liquid crystal panel 300 corresponding to the first end 130 and the second end 140 are not broken since they do not hit the stoppers.

It is noted that besides the stop stopper set 150, there may be another stopper disposed on the first side 120 of the mold frame 100 as long as no stoppers are disposed at the first end 130 and/or the second end 140 of the mold frame 100.

Figure 4:
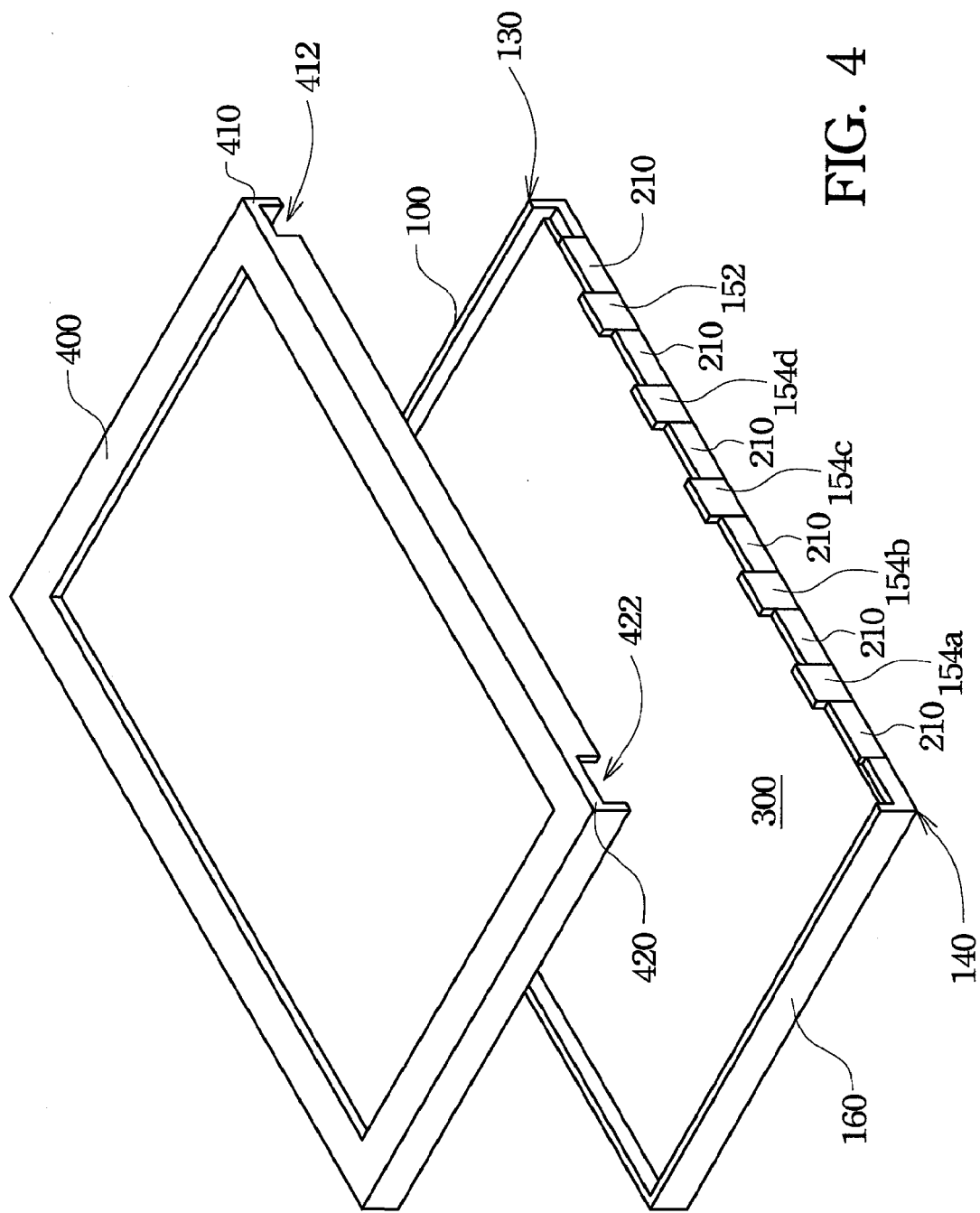
FIG. 4 is a schematic diagram illustrating an assembly structure of the mold frame and a bezel according to the second embodiment of the present invention.

FIG. 4 is a schematic diagram illustrating an assembly structure of the mold frame and a bezel according to the second embodiment of the present invention, wherein the printed circuit board (not shown) is folded to be under the mold frame 300, and the FPC 210 is folded into the gaps among the stoppers; the area between the stopper 152 and the first end 130; and the area between the stopper 154a and the second end 140. For matching the design of the mold frame 100, the bezel 400 has the first side structure 410 and a second side structure 420 built thereon. The first side structure 410 has the first opening 412 and is corresponding to the first end 130 of the mold frame 100; and the second side structure 420 has a second opening 422 and is corresponding to the second end 140 of the mold frame 100. With the setup of the first opening 412 and the second opening 422, when the first side 120 of the mold frame 100 is hit, the corner of the liquid crystal panel 300 corresponding to the first end 130 will not be broken due to hitting the bezel 400.

Hence, the assembly structure of the mold frame 100 and the bezel 400 according to this embodiment can prevent the problem of the liquid crystal panel 300 of which the corners are susceptible to being broken.

Hereinafter, the first side structure 410 and the second side structure 420 of the bezel 400 of the present invention are explained.

The shape of the first side structure 410 and that of the second side structure 420 are conformed to a first design area ratio and a second design area ratio respectively. Since the shape of the first side structure 410 is similar to that of the second side structure 420, and the principle of the first design area ratio is the same as that of the second area ratio are all the same, only the second side structure is used in the below for explanation.

Figure 5A:
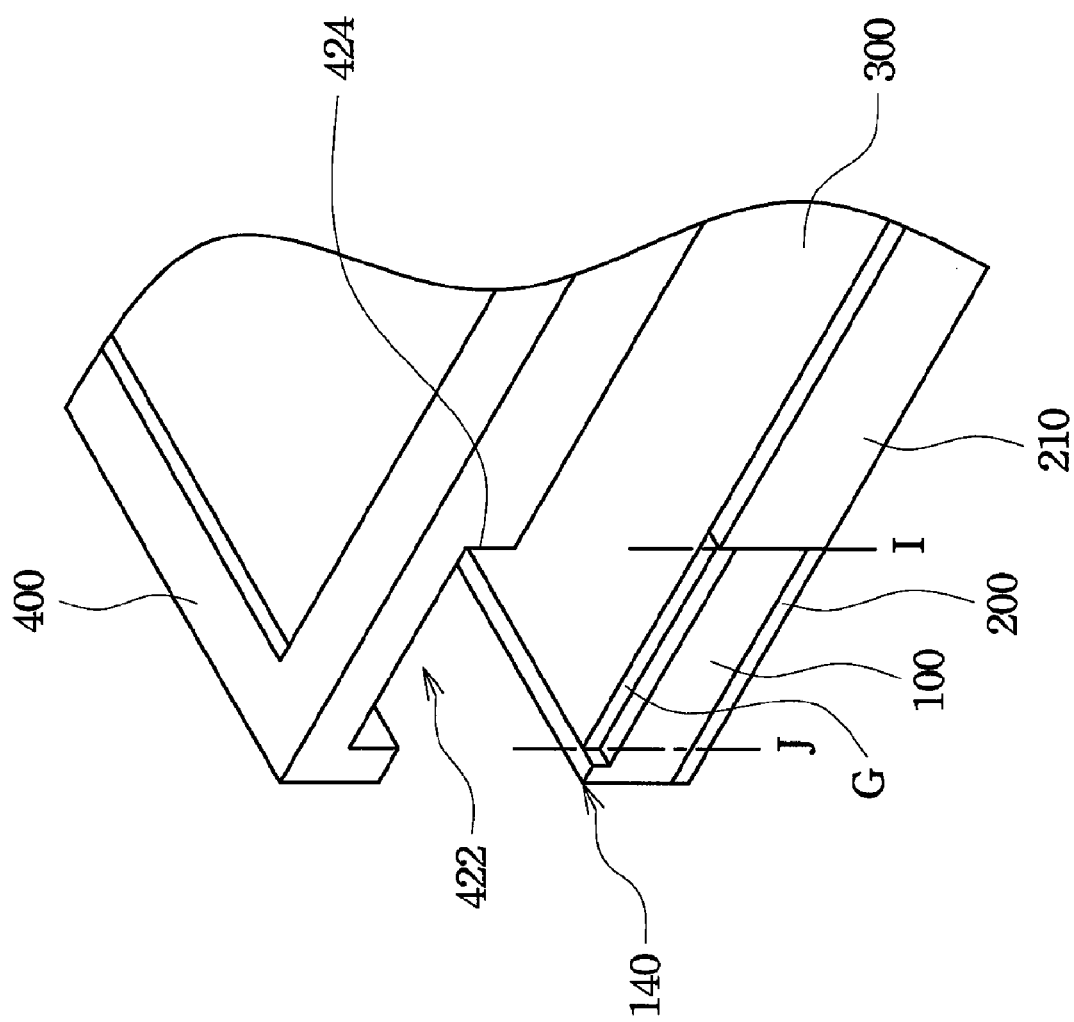
FIG. 5A and FIG. 5B are schematic diagrams illustrating a side structure of a bezel of the present invention.
Figure 5B:
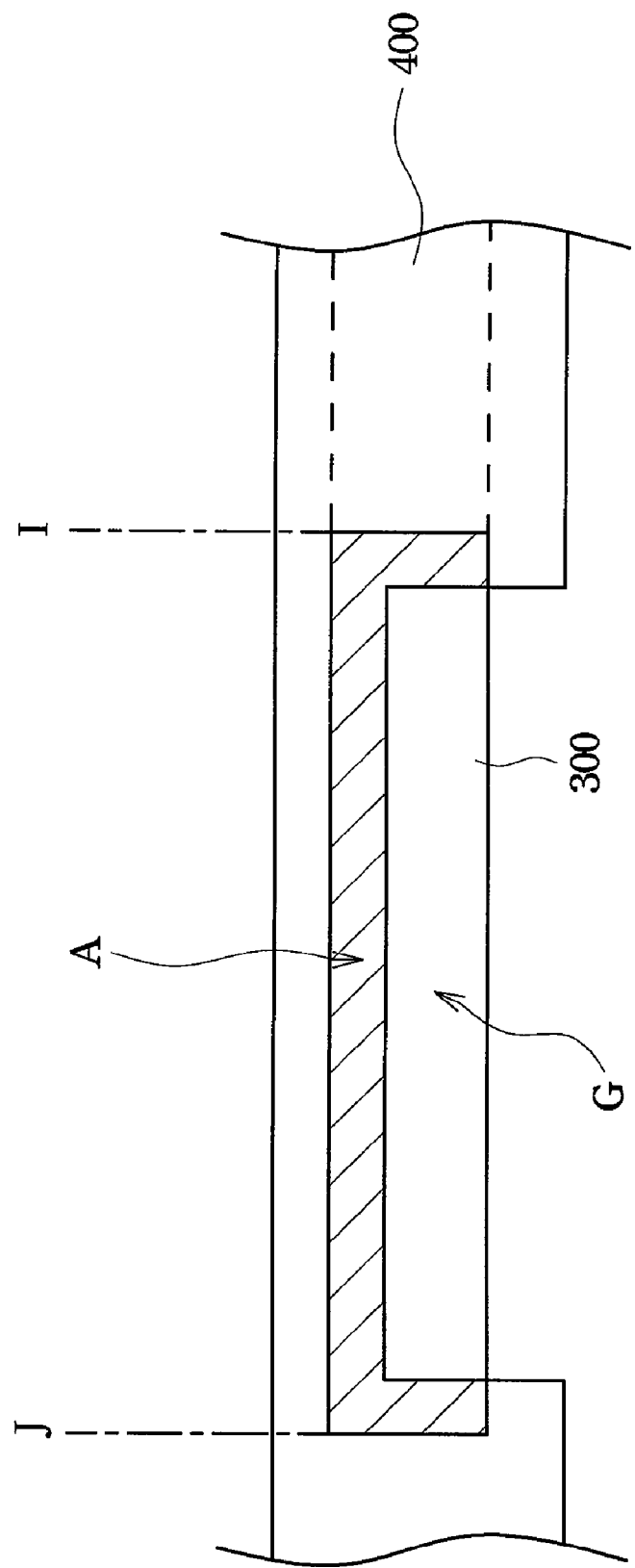

FIG. 5A and FIG. 5B are schematic diagrams illustrating a side structure of a bezel of the present invention. The FPC 210 has a border I adjacent to the second end 140 of the mold frame 100, and the second side structure 420 is corresponding to the region between the second end 140 of the mold frame 100 and the second border I of the FPC 210. The second design area ratio is a projected overlap area A divided by a panel portion area G of the liquid crystal panel 300, wherein the projected overlap area A is an area of the second side structure 420 of the bezel 400 projecting on a side of the liquid crystal panel 300, and the panel portion area G is an area of the side of the liquid crystal panel 300 corresponding to the region between the second end 140 (i.e. border J) of the mold frame 100 and the border I of the FPC 210. With the smaller design area ratio of the second side structure 420 of the bezel 400, there is better chance for preventing the liquid crystal panel 300 from hitting the mold frame 100 and the bezel 400. Preferably, the design area ratio of the second side structure 420 is between about 0% and about 70%.

Figure 6:
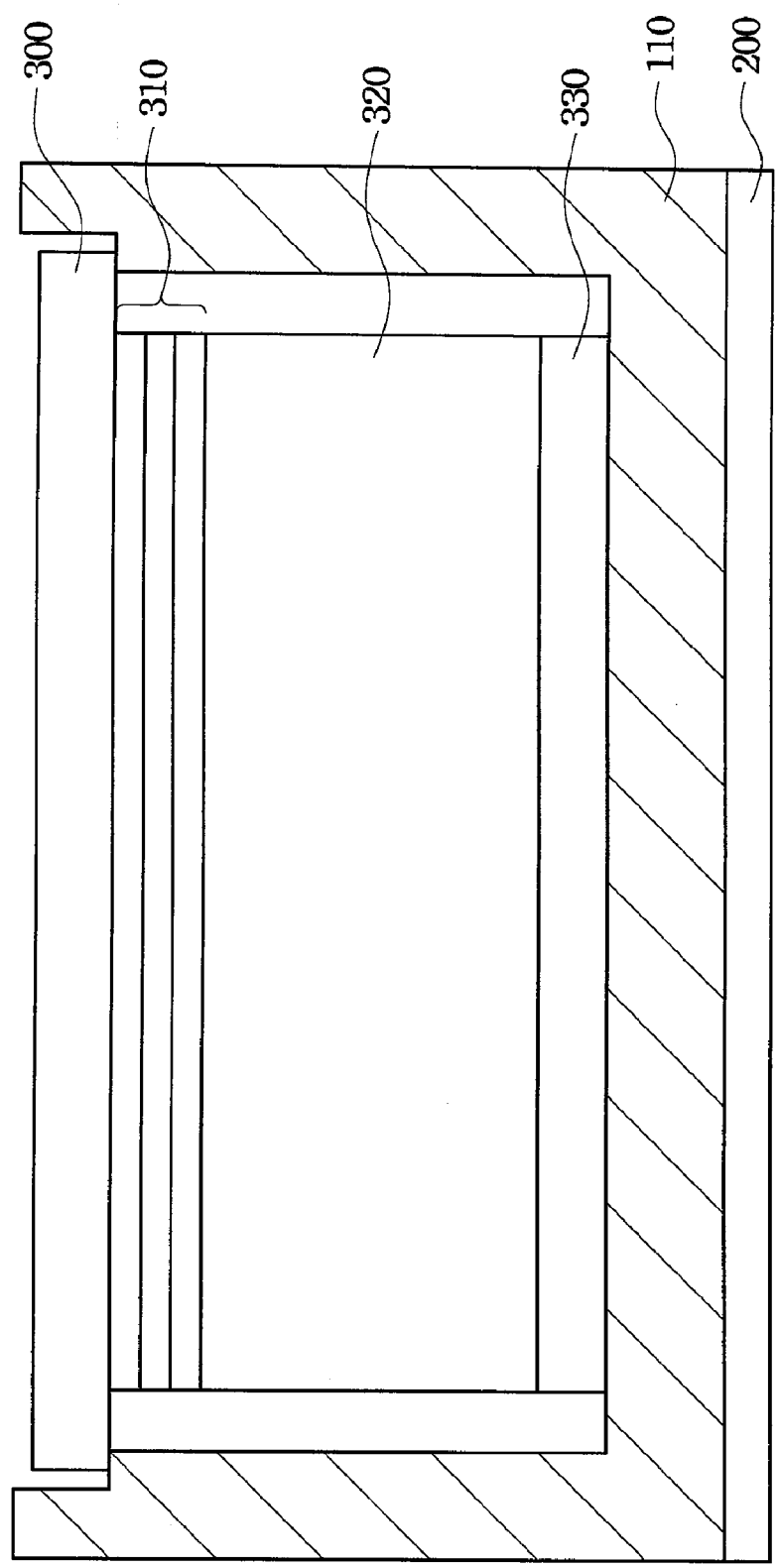
FIG. 6 is a schematic diagram illustrating a LCD of the present invention.

FIG. 6 is a schematic diagram illustrating a LCD of the present invention. A LCD of the present invention comprises the bezel (not shown) of the aforementioned embodiment, the mold frame 100, the printed circuit board 200, a reflective sheet 330, a light guide plate 320, at least one optical film 310 and the liquid crystal panel 300, wherein the printed circuit board 200 is located under the mold frame 100; the reflective sheet 330 is disposed in the inner surface of the bottom portion; the light guide plate 320 adjoins to the reflective sheet; the optical film 310 is disposed on the light guide plate 320; and the liquid crystal panel 300 is disposed on the optical film 310.

It is known from the embodiments described above that the present invention has the advantages of effectively improving the problem of the glass substrate that is susceptible to being broken under the trends of the increasing FPC width (i.e. greater resolution) and the increasingly thinned glass substrate.

It is known from the embodiments described above that the present invention has the advantages of not causing extra production cost; enhancing the stability of module assembling and providing stable light source, thereby improving the optical problems of lower luminance and poor lightness uniformity; and providing more frame space for use.

While the present invention has been described by way of example and in terms of preferred embodiment, it is to be understood that the present invention is not limited thereto. To the contrary, it is intended to cover various modifications and similar arrangements. Therefore, the scope of the appended claims should be accorded the broadest interpretation to encompass all such modifications and similar arrangements.

What is claimed is:

1. A liquid crystal display (LCD), comprising:
a mold frame, comprising:
a bottom portion having a first side, wherein the first side has a first end and a second end opposite to the first end, the first side having a stopper set disposed thereon, and the stopper set is composed of a plurality of separate stoppers sequentially arranged from the first end to the second end, and the first stopper of the stopper set is spaced a first distance apart from the first end of the mold frame, thereby forming a first gap with the first distance between the first stopper of the stopper set and the first end of the mold frame; and
a flexible print circuit board (FPC) disposed in the first gap and gaps among the stoppers of the mold frame, wherein the FPC has a first border adjacent to the first end of the mold frame;
a bezel in which the mold frame is received, the bezel having a first side structure aligned with the first end of the mold frame and the first border of the FPC, wherein the first side structure has a first opening exposing the region starting from the first end of the mold frame towards the first border of the FPC; and
a liquid crystal panel disposed on the bottom portion of the mold frame, wherein the first opening of the bezel is aligned with the first end of the mold frame to expose a corner of the liquid crystal panel through the first opening and the first gap.

2. The LCD of claim 1, wherein the last stopper of the stopper set is disposed at the second end of the first side of the mold frame.

3. The LCD of claim 1, wherein the shape of the first side structure is conformed to a first design area ratio, and the first design area ratio is a first projected overlap area divided by a first panel portion area, and wherein:
the first projected overlap area is an area of a sidewall of the first side structure of the bezel projecting on a side of the liquid crystal panel; and
the first panel portion area is an area of the side of the liquid crystal panel corresponding to the region between the first end of the mold frame and the first border of the FPC.

4. The LCD of claim 3, wherein the first design area ratio is between about 0 and 70%.

5. The LCD of claim 1, wherein the last stopper of the stopper set is spaced a second distance apart from the second end of the mold frame, thereby forming a second gap with the second distance between the last stopper of the stopper set and the second end of the mold frame, and the FPC is disposed in the second gap.

6. The LCD of claim 5, wherein the FPC has a second border adjacent to the second end of the mold frame, and the bezel has a second side structure aligned with the second end of the mold frame and the second border of the FPC, and the second side structure has a second opening exposing the region starting from the second end of the mold frame towards the second border of the FPC, and the second opening is aligned with the second end of the mold frame to expose another corner of the liquid crystal panel through the second opening and the second gap.

7. The LCD of claim 6, wherein the shape of the second side structure is conformed to a second design area ratio, and the second design area ratio is a second projected overlap area divided by a second panel portion area, and wherein:
the second projected overlap area is an area of a sidewall of the second side structure of the bezel projecting on a side of the liquid crystal panel; and the second panel portion area is an area of the side of the liquid crystal panel corresponding to the region between the second end of the mold frame and the second border of the FPC.

8. The LCD of claim 7, wherein the second design area ratio is between about 0 and 70%.

9. The LCD of claim 1, further comprising:
a sidewall disposed at the other sides of the bottom portion besides the first side.

10. The LCD of claim 1, further comprising:
a reflective sheet disposed in the inner surface of the bottom portion;
a light guide plate adjoining to the reflective sheet;
at least one optical film disposed on the light guide plate; and
the liquid crystal panel disposed on the optical film.

11. A liquid crystal display (LCD), comprising:
a mold frame, comprising:
  a bottom portion having a first side, wherein the first side has a first end and a second end opposite to the first end, the first side having a stopper set disposed thereon, and the stopper set is composed of a plurality of stoppers sequentially arranged from the first end to the second end, and the first stopper of the stopper set is spaced a first distance apart from the first end of the mold frame, thereby forming a first gap with the first distance between the first stopper of the stopper set and the first end of the mold frame; and
a flexible print circuit board (FPC) disposed in the first gap and gaps among the stoppers, wherein the FPC has a first border adjacent to the first end of the mold frame;
a bezel in which the mold frame is received, the bezel having a first side structure aligned with the first end of the mold frame and the first border of the FPC, wherein the first side structure has a first opening exposing the region starting from the first end of the mold frame towards the first border of the FPC; and
a liquid crystal panel disposed on the bottom portion of the mold frame, wherein the first opening of the bezel is aligned with the first end of the mold frame to expose a corner of the liquid crystal panel through the first opening and the first gap;
wherein the shape of the first side structure is conformed to a first design area ratio, and the first design area ratio is a first projected overlap area divided by a first panel portion area, and wherein:
the first projected overlap area is an area of a sidewall of the first side structure of the bezel projecting on a side of the liquid crystal panel; and
the first panel portion area is an area of the side of the liquid crystal panel corresponding to the region between the first end of the mold frame and the first border of the FPC, wherein the first design area ratio is greater than or equal to 0% and is smaller than or equal to 70%.

12. The LCD of claim 11, wherein the last stopper of the stopper set is disposed at the second end of the first side of the mold frame.

13. The LCD of claim 11, wherein the last stopper of the stopper set is spaced a second distance apart from the second end of the mold frame, thereby forming a second gap with the second distance between the last stopper of the stopper set and the second end of the mold frame, and the FPC is disposed in the second gap.

14. The LCD of claim 13, wherein the FPC has a second border adjacent to the second end of the mold frame, and the bezel has a second side structure aligned with the second end of the mold frame and the second border of the FPC, and the second side structure has a second opening exposing at least one portion of the region starting from the second end of the mold frame towards the second border of the FPC, and the second opening is aligned with the second end of the mold frame to expose another corner of the liquid crystal panel through the second opening and the second gap.

15. The LCD of claim 14, wherein the shape of the second side structure is conformed to a second design area ratio, and the second design area ratio is a second projected overlap area divided by a second panel portion area, and wherein:
the second projected overlap area is an area of a sidewall of the second side structure of the bezel projecting on a side of the liquid crystal panel; and
the second panel portion area is an area of the side of the liquid crystal panel corresponding to the region between the second end of the mold frame and the second border of the FPC, wherein the second design area ratio is greater than or equal to 0% and is smaller than or equal to 70%.

16. The LCD of claim 11, further comprising:
a sidewall disposed at the other sides of the bottom portion besides the first side.

17. The LCD of claim 11, further comprising:
a reflective sheet disposed in the inner surface of the bottom portion;
a light guide plate adjoining to the reflective sheet;
at least one optical film disposed on the light guide plate; and
the liquid crystal panel disposed on the optical film.

* * * * *